US011402399B2

(12) United States Patent
Charmillot et al.

(10) Patent No.: US 11,402,399 B2
(45) Date of Patent: Aug. 2, 2022

(54) SYSTEM AND METHOD FOR IMPROVED LIQUID HANDLING

(71) Applicant: Andrew Alliance S.A., Geneva (CH)

(72) Inventors: Sylvain Charmillot, Nyon (CH);
Gregory Jordan, Cointrin (CH);
Giorgio Horak, Geneva (CH); Antoine Jordan, Veyrier (CH)

(73) Assignee: Andrew Alliance S.A., Vernier (CH)

( * ) Notice: Subject to any disclaimer, the term of this patent is extended or adjusted under 35 U.S.C. 154(b) by 524 days.

(21) Appl. No.: 16/535,269

(22) Filed: Aug. 8, 2019

(65) Prior Publication Data

US 2020/0049728 A1    Feb. 13, 2020

Related U.S. Application Data

(60) Provisional application No. 62/715,934, filed on Aug. 8, 2018.

(51) Int. Cl.
*G01N 35/10* (2006.01)
*G01N 35/00* (2006.01)
*G01N 35/04* (2006.01)

(52) U.S. Cl.
CPC ... *G01N 35/1074* (2013.01); *G01N 2035/103* (2013.01)

(58) Field of Classification Search
CPC .......... G01N 35/1074; G01N 35/1011; G01N 35/009; G01N 2035/0425; G01N 2035/103
See application file for complete search history.

(56) References Cited

U.S. PATENT DOCUMENTS

| 5,906,795 A | * | 5/1999 | Nakashima | ........ | G01N 35/1009 |
| | | | | | 73/864.32 |
| 5,915,284 A | * | 6/1999 | Meltzer | ................. | B01L 3/0279 |
| | | | | | 73/864.17 |
| 6,997,066 B2 | | 2/2006 | DeSilva et al. | | |
| 7,267,801 B2 | * | 9/2007 | Hitch | .................. | G01N 35/1065 |
| | | | | | 422/65 |
| 2012/0258026 A1 | * | 10/2012 | Naumann | ............. | B01L 3/0234 |
| | | | | | 422/521 |
| 2019/0255533 A1 | * | 8/2019 | Wilmer | ................ | G01N 35/109 |
| 2020/0341022 A1 | * | 10/2020 | Shibahara | ............. | B01L 3/0279 |

FOREIGN PATENT DOCUMENTS

WO        2018002254 A1        1/2018

OTHER PUBLICATIONS

International Search Report & Written Opinion in PCT/IB2019/000891 dated Feb. 6, 2020; 11 pages.

* cited by examiner

*Primary Examiner* — Herbert K Roberts
*Assistant Examiner* — Fatemeh Esfandiari Nia
(74) *Attorney, Agent, or Firm* — Schmeiser, Olsen & Watts LLP

(57) ABSTRACT

A liquid handling system and method includes a liquid handling device with a plurality of pipetting heads and a tip box having a plurality of tips for removable attachment to the pipetting heads. A lever mechanism engages the liquid handling device and tip box during insertion of the pipetting heads into the tips to lesser the required insertion force.

18 Claims, 9 Drawing Sheets

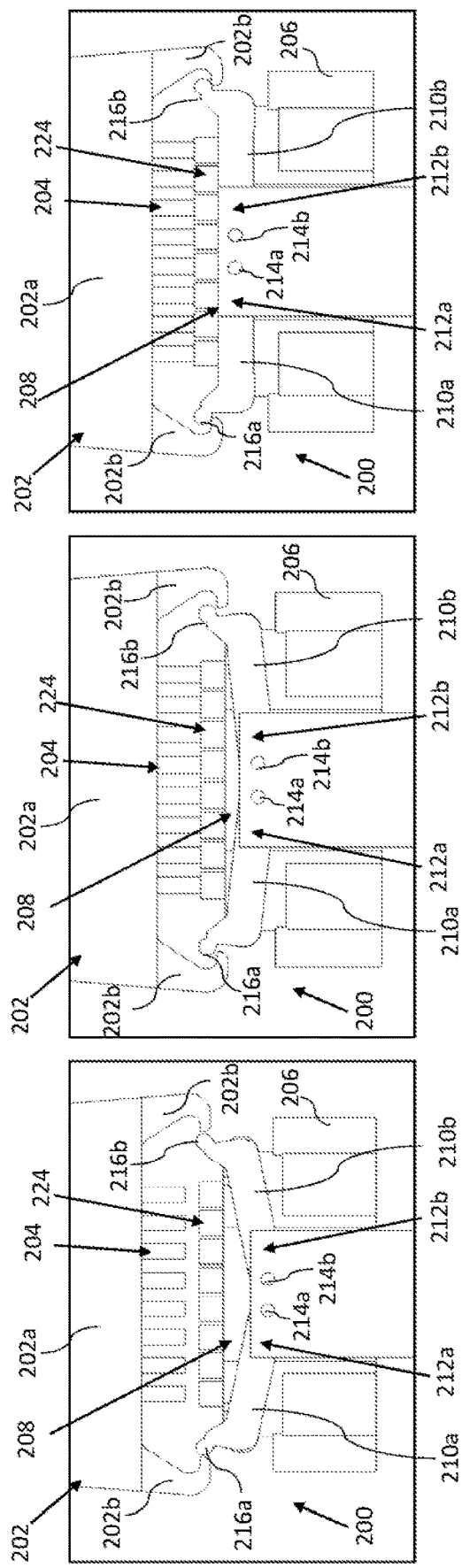

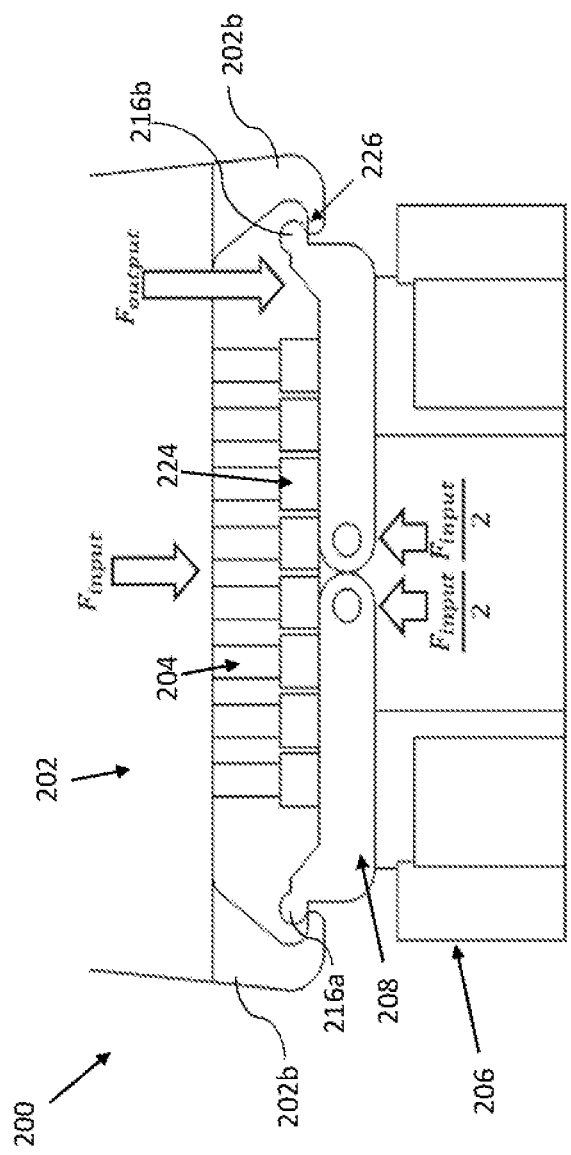

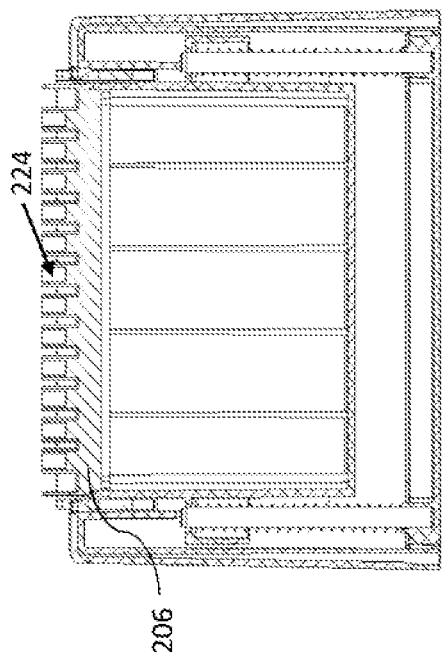
FIG. 7e
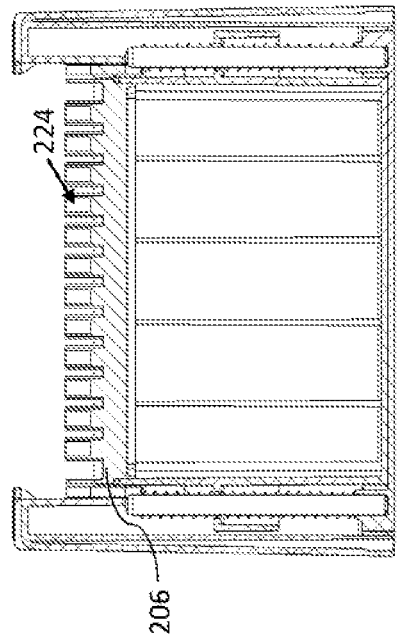
FIG. 7f
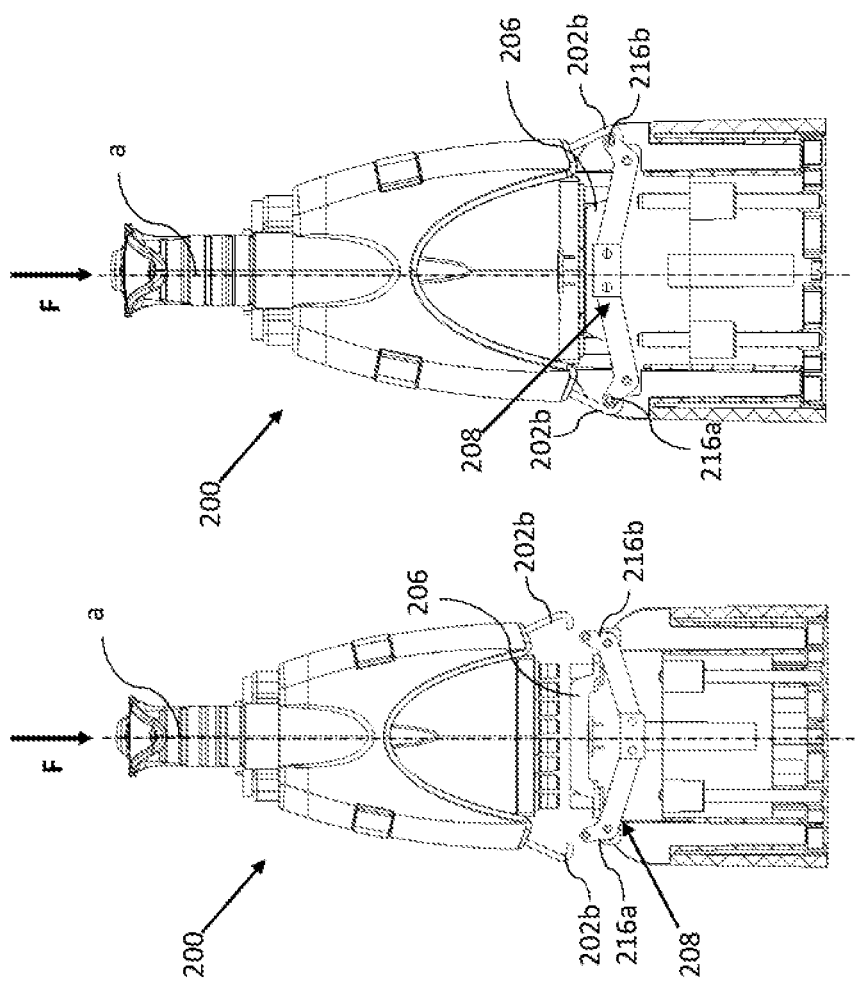
FIG. 7c
FIG. 7d

SYSTEM AND METHOD FOR IMPROVED LIQUID HANDLING

CROSS REFERENCE TO RELATED APPLICATIONS

This application claims priority to and the benefit of U.S. Provisional Patent Application No. 62/715,934, filed on Aug. 8, 2018 and titled "METHOD AND APPARATUS TO DECREASE TIP INSERTION FORCE", the contents of which are incorporated herein by reference as though fully set forth herein.

FIELD OF THE TECHNOLOGY

The present disclosure relates to the field of chemical, biological and biochemical process or reaction. More specifically, it discloses an improved system and method for handling liquid in the aforementioned fields.

BACKGROUND OF THE TECHNOLOGY

The liquid handling process is of great importance in the field of biology, biochemistry and chemistry for the execution of experiments, in particular in-vitro.

In general, "liquid hander" or "liquid handling device" is used herein to describe any device capable of aspirating a sample from a source consumable and dispensing the same sample (or aliquot) into a destination consumable. In particular, we identify as a generic liquid handler those systems designed to perform liquid handling—as defined above—among a wide variety of consumables, typically identified and configured by the liquid handling users. Some examples of generic liquid handlers are the Beckman Coulter Biomek, the TECAN Evo, the Qiagen Qiacube, the Andrew Alliance Andrew robot, a mechanical manual pipette, or an electronic liquid handling pipette. All existing liquid handlers can be characterized by a bench space, where the consumables sit, and a "liquid handling head" that transports the samples from one or a plurality of source consumable to one or a plurality of destination consumables. In the examples above, a manual pipette (or a part of it) can be considered both a liquid handler or a liquid handling head (the user and the laboratory bench being part of the liquid handler). More narrowly, we define a flexible liquid handler to be a liquid handling apparatus designed to serve liquid handling steps that are not rigidly predefined, and may change from time to time in sequence, or order, or length, or among consumables that are not strictly predefined. The processes performed by a flexible liquid handler are defined to be flexible liquid handling processes.

The term "consumable" is defined herein as any container of liquids or suspensions, for example—but not limited to—tubes, microtubes, vacutainers, tube arrays, microplates of all sizes, microchips, petri dishes, strips and similar. The term "tip" is used herein to describe a specific consumable that can be physically attached to a liquid handling head and that's designed for the temporary storage of liquid between the steps of aspiration and dispensing. A tip for liquid handling is generally intended as removable or permanent interface between the fluid and the liquid handling device. In a specific implementation, the tip can be meant to contain the fluid aspirated and dispensed by the liquid handler. Tips can be considered as disposable tips when they are used a single time (normally to prevent contamination) and when they can be reused multiple times (permanent tips). Tips are typically characterized by a lower bore, allowing to aspirate the sample from its open surface, and dispense the collected liquid through the same orifice. Liquids are kept inside the tip, during the two steps, by retention of the liquid into the tip through the action of an under pressure over one liquid surface and the exploitation of the liquid viscosity and surface tension properties.

Since liquid handling is one of the most repetitive and widespread activities in the life science and diagnostic field, any improvement in liquid handling methods has a significant impact in the industry activities and can result in significant costs savings and quality improvements. For example, the action of transporting a sample from one consumable to another consumable exposes the risk of losses of sample during the transportation, since the aspiration and dispensing device maybe optimally designed for the purpose of aspirating and dispensing but not for the purpose of isolating the sample during transportation: that's the case of a plastic tip with a bore at the bottom. In some cases, for example in molecular biology applications before PCR amplification, a loss of an individual molecule during the transportation may have the consequence of samples contamination: in some applications (for example, in forensics) consequences may be catastrophic.

Also, the sophistication and complexity of pipetting heads has significantly increased over time: some heads may include 8, 12, 16, 96, or 384 simultaneous aspirations and dispensing channels, operating synchronously or independently. Such heads become significantly heavy, so that the precise and rapid movement of such a head over consumables may pose significant challenges in the mechanical structure, that has to be sized and dimensioned accordingly.

The increasingly large number of channels in liquid handlers additionally multiplies the risk of sample contaminations. Since liquid handlers typically aspirate and dispense liquid from their top surface in contact with air, they have an exposed orifice in their bottom region: as a consequence, the possibility of dripping liquids, dispersion of aerosols and vapors cannot be excluded.

The term "docking" is used herein to describe the action of physically connecting or disconnecting from an object. Docking can be achieved through mechanical means or through non-material means, for example by the action of a force field. For a given liquid handling operation, removable tips are docked on the pipetting heads of the liquid handler. Attaching the pipetting heads to removable tips can require a significant amount of force. To combat this, various solutions have been used including magnetic and active systems. This can result in much more complex systems, leading to heavier and more expensive liquid handling systems.

SUMMARY OF THE TECHNOLOGY

In one aspect of the present disclosure, the subject technology provides a simplified liquid handling system which reduces the insertion for necessary for connecting pipetting heads to tips using a mechanical lever to amplify input force, and a related method of liquid handling.

In one aspect of the present disclosure, the subject technology relates to a liquid handling system with a liquid handling device having a plurality of pipetting heads. A tip box has a plurality of tips configured for removable attachment to the pipetting heads. A lever mechanism is configured to engage the liquid handling device and the tip box during a process of moving the liquid handling device along a central axis in the direction of the tip box for attachment of the tips to the pipetting heads. The lever mechanism includes first lever arms and second lever arms. The first lever arm is attached to a first fulcrum proximate the central axis, extending outwardly from the central axis, and terminating in a first arm end. The second lever arm is attached to a second fulcrum proximate the central axis, extending outwardly from the central axis, and terminating in a second arm end. The lever mechanism is configured to receive a force from the liquid handling device proximate the first fulcrum and the second fulcrum, the first lever arm and second lever arm applying an opposite force to urge the tip box and liquid handling device together.

In one aspect of the present disclosure, the first lever arm and second lever are configured to apply the opposite force by engaging, by the first arm end and the second arm end, opposing sides of a periphery of the tip box to urge the tip box towards the liquid handling device. The first lever arm and the second lever can include flanges, the first lever arm and second lever arm being configured to apply the opposite force by engaging, with the flanges of the first lever arm and second lever arm, flanges of the periphery of the tip box. The periphery of the tip box can include a first periphery member on a first side of the tip box and a second periphery member on an opposing side of the tip box. The lever mechanism can be configured such that when the lever mechanism applies the opposite force, the first arm end engages the first periphery member and the second arm end engages the second periphery member.

In one aspect of the present disclosure, the first lever arm and second lever are configured to apply the opposite force by engaging, by the first arm end and the second arm end, opposing sides of a periphery of the liquid handling device to urge the liquid handling device toward the tip box. The periphery of the liquid handling device can have a first periphery member on a first side of the liquid handling device and a second periphery member on an opposing side of the liquid handling device. The lever mechanism can be configured such that when the lever applies the opposite force, the first arm end engages the first periphery member and the second arm end engages the second periphery member. The first periphery member and the second periphery member can each include hooks and the first arm end and the second arm end can be cylindrical. The first arm end can be configured to engage the first periphery member by moving the cylindrical first arm end within a hook of the first periphery member. The second arm end can be configured to engage the second periphery member by moving the cylindrical second arm end within a hook of the second periphery member.

In one aspect of the present disclosure, the liquid handling device includes an elastic component configured to flex during insertion of the pipetting heads into the tips to evenly apply force across the tips.

In one aspect of the present disclosure, the tip box includes an elastic component configured to flex during insertion of the pipetting heads into the tips to evenly apply force across the tips.

In one aspect of the present disclosure, the subject technology relates to a method for connecting components during liquid handling. A liquid handling device having a plurality of pipetting heads is provided. A tip box having a plurality of tips configured for removable attachment to the pipetting heads is provided. The liquid handling device and the tip box are aligned along a central axis. A lever mechanism is positioned along the central axis to engage the liquid handling device and the tip box during a processing of moving the liquid handling device along the central axis in the direction of the tip box for attachment of the tips to the pipetting heads. The lever mechanism includes a first lever arm attached to a first fulcrum positioned proximate the central axis, extending outwardly from the central axis, and terminating in a first arm end. The lever mechanism also includes a second lever arm attached to a second fulcrum positioned proximate the central axis, extending outwardly from the central axis, and terminating in a second arm end. The tips are attached to the pipetting heads by moving the liquid handling device along the central axis to apply a force proximate the first fulcrum and the second fulcrum such that the first lever arm and second lever arm apply an opposite force to urge the tip box and liquid handling device together.

In one aspect of the present disclosure, during the step of attaching the tips to the pipetting heads, the opposite force is applied by engaging, by the first arm end and the second arm end, opposing sides of a periphery of the tip box to urge the tip box towards the liquid handling device. In some embodiments, during the step of attaching the tips to the pipetting heads, the opposite force is applied by engaging, with flanges of the first lever arm and second lever arm, flanges of the periphery of the tip box. In some embodiments, during the step of attaching the tips to the pipetting heads, the lever mechanism applies the opposite force by engaging a first periphery member on a first side of the tip box with the first arm end and engaging a second periphery member on an opposing side of the tip box with the second arm end.

In one aspect of the present disclosure, during the step of attaching the tips to the pipetting heads, the opposite force is applied by engaging, by the first arm end and the second arm end, opposing sides of a periphery of the liquid handling device to urge the liquid handling device toward the tip box. In some embodiments, during the step of attaching the tips to the pipetting heads, the lever mechanism applies the opposite force by engaging a first periphery member on a first side of the liquid handling device with the first arm end and a second periphery member on an opposing side of the liquid handling device with the second arm end. The first periphery member and the second periphery member each can include hooks and the first arm end and the second arm end can be cylindrical. In some embodiments, during the step of attaching the tips to the pipetting heads, the cylindrical first arm end is moved within a hook of the first periphery member and the cylindrical second arm end is moved within a hook of the second periphery member.

In one aspect of the present disclosure, during the step of attaching the tips to the pipetting heads, an elastic component of the liquid handling device is flexed to evenly apply force across the tips.

In one aspect of the present disclosure, during the step of attaching the tips to the pipetting heads, an elastic component of the tip box is flexed to evenly apply force across the tips.

BRIEF DESCRIPTION OF THE DRAWINGS

FIGS. 5a-5c are front views of a different embodiment of a liquid handling system in accordance with the subject technology in different positions.

FIG. 6 is a front view of the liquid handling system of FIGS. 5a-5c showing applied forces.

FIGS. 7c-7d are front views of the liquid handling system of FIGS. 5a-5c in different positions.

FIGS. 7e-7f are front views of a tip box for the liquid handling system of FIGS. 5a-5c in different positions.

DETAILED DESCRIPTION OF THE TECHNOLOGY

Figure 1:
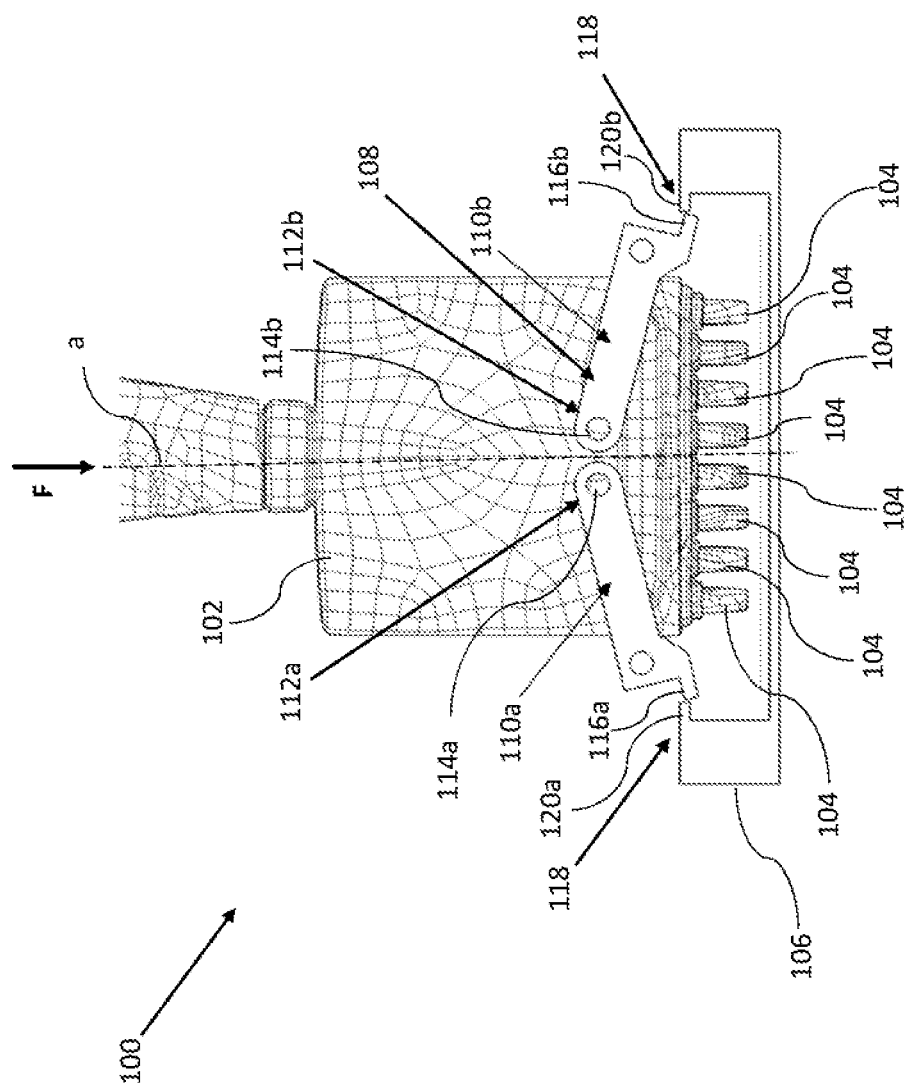
FIG. 1 is a front view of a liquid handling system in accordance with the subject technology.
Figure 2:
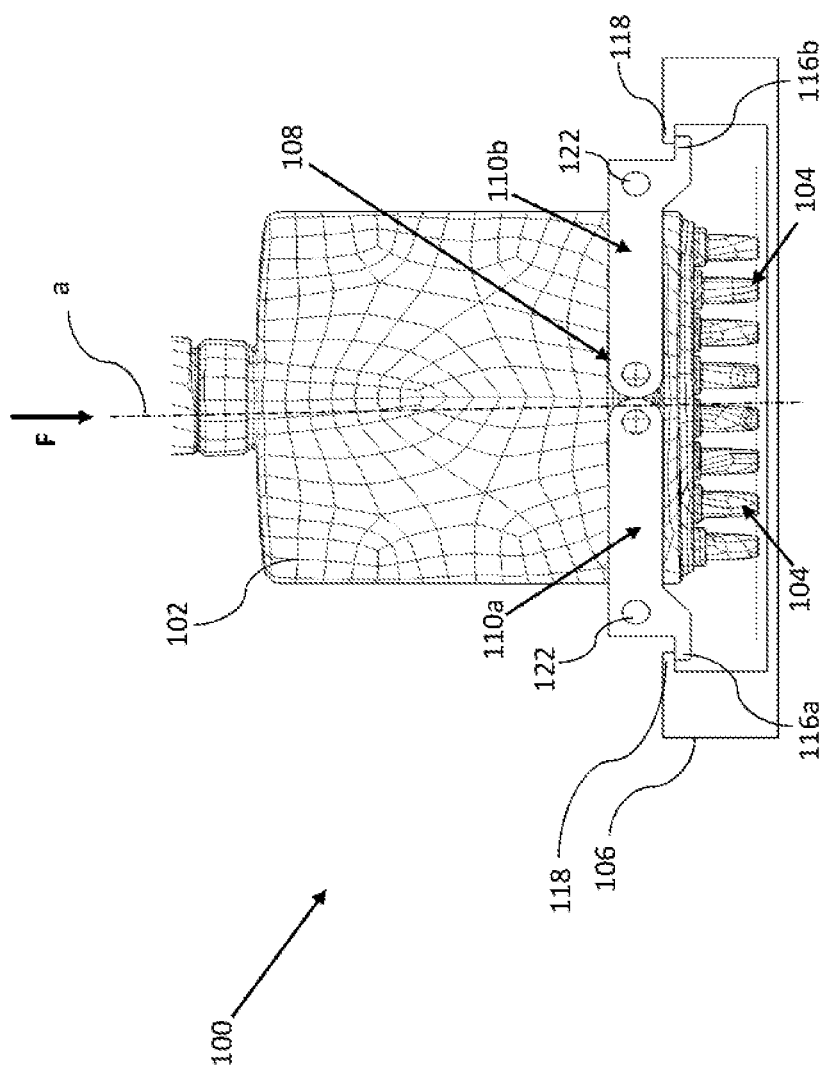
FIG. 2 is a front view of the liquid handling system of FIG. 1 in a different position.

The subject technology overcomes many of the prior art problems associated with liquid handling systems and methods. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

The subject matter herein describes a system and method to decrease the force required to attach a consumable tip using a simplified passive designs solution. The utility of reducing forces consists in the possibility of lighter systems (a vertical, downward insertion force can be exerted that is larger than the eight of the liquid handler) and simpler and less expensive liquid handlers, by reducing the stress on the liquid handler frame.

The subject technology is based on the principle of the mechanical lever which amplifies the input force. The mechanical advantage is achieved according to the law:

$$F_{output} = F_{input} * l_{input} / l_{output} = F_{input} * \eta$$

In the above equation, $F_{output}$ and $F_{input}$ are respectively the output and input force, $l_{output}$ and $l_{input}$ are the perpendicular distances between the forces and the fulcrum and $\eta$ is the mechanical advantage of the lever.

Referring now to FIG. 1-4, a liquid handling system 100 in accordance with the subject technology is shown. The liquid handling system includes 100 a liquid handling device 102 which includes a plurality of pipetting heads 104. A tip box 106 includes a plurality of consumable tips (not distinctly show) which can be removably attached to the pipetting heads to pipet for the temporary storage and dispensing of a liquid in a chemical, biological, or biochemical experiment, or the like. In general, the liquid handling device 102 is moved into the tip box 106 along a central axis "a", and pressed into the tip box 106 with a force "F" to cause the pipetting heads 104 to attach to the tips.

During this process, the lever mechanism 108 engages the liquid handling device 102 and the tip box 106. The lever mechanism 108 includes two lever arms 110a, 110b (generally 110). Each lever arm 110 is fixed at a central location near the central axis "a", the first lever arm 110a extending from a first fulcrum 112a to rotate around a hinge 114a and the second lever arm 110b extending from a second fulcrum 112b to rotate around a hinge 114b. Force applied at the fulcrums 112a, 112b (generally 112) forces both fulcrums 112 downward along the central axis "a", causing rotation of the lever arms 110. As the lever arms 110 rotate, lever arm ends 116a, 116b (generally 116) are displaced upwards a lesser distance than the fulcrums 112 move downwards as a result of the lever action. The lever arm ends 116a, 116b engage the opposite sides of the periphery 118 of the tip box 106, and provide an opposite force to the downward force "F" as a result of the rotational action of the lever arms 110. In the example provided, the periphery 118 of the tip box 106 includes flanges 120a, 120b, which engage flanges on the first and second ends 116a, 116b, respectively. The opposite force applied to the periphery 118 of the tip box 106 by the lever arms 110 urges the tip box 106 and liquid handling device 102 to come together such that the tips can be attached to the pipetting heads 104. In this way, the lever mechanism 108 reduces the amount of force needed to attach the pipetting heads 104 to the tips by, as the liquid handling device 102 pushes the fulcrum 112 downward a distance, disbursing the force "F" applied at the fulcrum 112 through the ends 116. This allows the tips to be easily attached to the pipetting heads 104, even when the down force "F" is less than the force that would normally be required, without the lever mechanism 108, to attach the tips to the pipetting heads 104.

Figure 3:
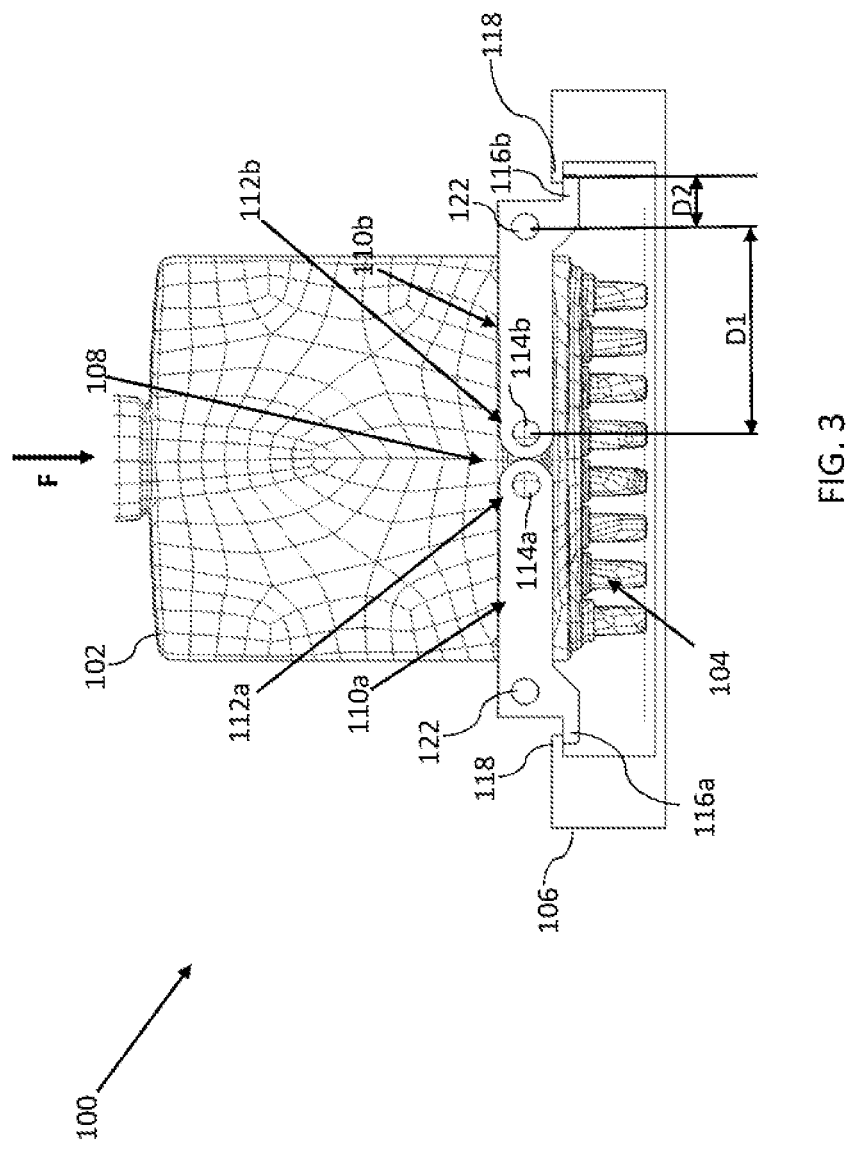
FIG. 3 is another view of the liquid handling system of FIG. 2.
Figure 4:
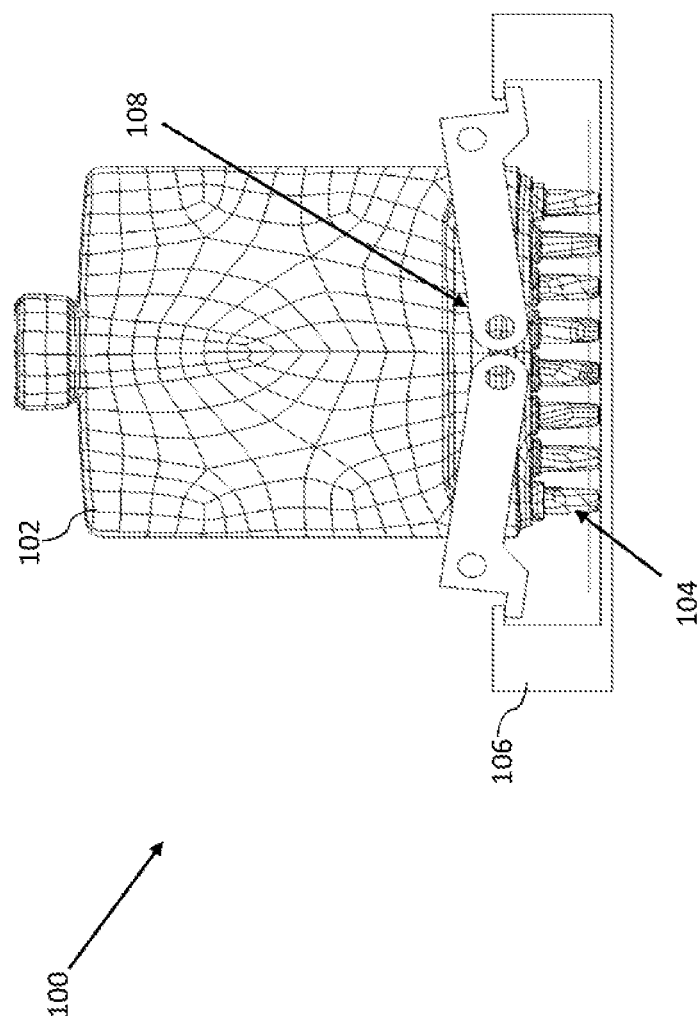
FIG. 4. is a front view of the liquid handling system of FIG. 1 in a different position.

In particular, FIG. 1 represents the liquid handling system 100 in a first position, just prior to, or as the liquid handling device 102 moves into the tip box 106 and is first engaged with the lever mechanism 108. As the force "F" presses the liquid handling device 102 into the tip box 106, the force "F" is applied to the lever mechanism 108 near the fulcrums 112, which is to say, near the central axis "a." The force "F" pushes the fulcrum downward, to the position shown in FIG. 2, where the pipetting heads 104 first engage the tips within the tip box 106. This causes the ends 116 of the lever arms to move upwards and engage the periphery 118 of the tip box 106. In the example shown, the lever arms 110 pivot around fixed outer hinges 122, which can be attached to the liquid handling device 102 or other fixed structure to create the leverage for the lever mechanism 108. As shown in FIG. 3, since the distance "D1" between the fulcrum hinges 114 and the outer hinges 122 is greater than the distance "D2" between the outer hinges 122 and the point of engagement between the lever arm ends 116 and tip box periphery 118, a greater upward force is applied to the tip box 106 than the downward force "F." The upward force applied from the lever arms 110 to the periphery 118 is thereby increased due to the mechanical advantage provided by the lever mechanism 108. Eventually, in the position shown in FIG. 4, the liquid handling device 102 has moved into a final position where the pipetting heads 104 are completely within the tip box 106 such that the tips have each attached to a corresponding pipetting head 104.

Referring now to FIGS. 5-9, a second embodiment of a liquid handling system 200 in accordance with the subject technology is shown. In general, the liquid handling system 200 can includes similar components to the components of liquid handling system 100 and function in accordance with similar processes and principles, except as otherwise described herein. The primary difference between the system 100 and the system 200 is that the lever mechanism 108 is outside of the tip box 106, while the lever mechanism 208 is integrated within the tip box 206. Generally, lever mechanisms in accordance with the subject technology can be implemented in either or both of the tip box and/or liquid handling device, or as a separate device outside of either.

Still referring to FIGS. 5-9, as with the system 100, the liquid handling device 202 includes a plurality of pipetting heads 204 and the tip box 206 includes a plurality of consumable tips 224 which can be removably attached to the pipetting heads 204 to pipet for the temporary storage and dispensing of a liquid in a chemical, biological, or biochemical experiment, or the like. The system 200 includes a lever mechanism 208 which has two lever arms 210a, 210b (generally 210). Each lever arm 210 is fixed at a central location within the tip box 206 at central pivots 214a, 214b (generally 214) to pivot around fulcrum points 212a, 212b (generally 212) as a force is applied from the liquid handling device 202, as described in more detail below.

In the system 200, the liquid handling device 202 includes a body 202a and an adaptor portion 202b. The adaptor portion 202b is fitted with hooks which are optimized to facilitate the engagement of the lever arm ends 216a, 216b (generally 216). As shown in FIG. 5a, as the liquid handling device 202 is moved towards the tip box 206, the hooks of the adaptor portion 202b are moved around arm ends 216. As the pipetting heads 204 contact the tips 224, the hooks wrap around the outside of the arm ends 216 and connect to the arm ends 216 such that a downward force from the arm ends 216 will apply a downward force to the adaptor portion 202b, urging the liquid handling device 202 and tip box 206 together. As the liquid handling device 202 continues to move downward to secure the tips 224 on the pipetting heads 204, the lever arm 210 is forced into a level position and the arm ends 216 are fully connected to, and applying a downward force to, the hooks of the adaptor portion 202b.

In addition to working with the lever mechanism 208, the hooks improve the lateral alignment of the pipetting heads 204 with respect the aperture of the tips 224, allowing a more reproducible insertion of the pipette heads 204 inside the tips 224. The shape and dimensions of the hooks may be optimized to guide the positioning of the pipette heads 204 inside the tips 224 and ensure the required lateral positioning in one or two dimensions. Moreover, the hooks may be designed to act as mechanical stop for the relative vertical displacement of the pipette heads 204 inside the tips 224 to ensure the most suitable vertical position. In an embodiment, one or more of the hooks is equipped with one or more pressure sensors to measure the force applied for the insertion of the tip 224. When the measured force differs from an optimal insertion force, the system 200 can employ corrective means, such as an alert to the user or a means to mechanical limit or increase the force as necessary.

Referring now to FIG. 6, the downward "$F_{input}$" arrow represents the applied force from the liquid handling device 202, which is applied to the lever mechanism 208 through the tip box 206 as the pipette heads 204 come in contact with the tips 224. The opposite force generated from the response of the lever mechanism 208 is depicted by the downward "$F_{output}$" arrow, which results from the lever arm ends 216 acting on the adaptor portion 202b. More particularly, the "$F_{output}$" force is applied from the arm ends 216 against the adaptor portion 202b to urge the liquid handling device 202 and the tip box 206 together for attachment of the tips 224 to the pipette heads 204.

Figure 7B:
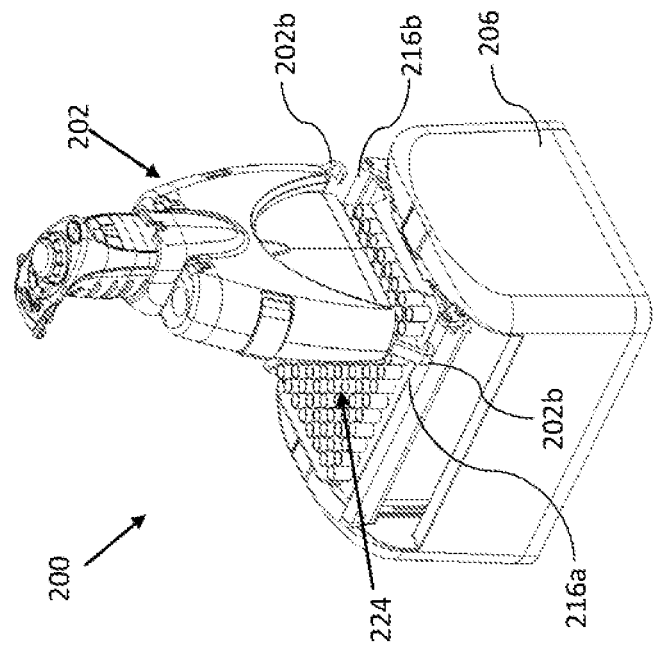
FIG. 7b is a perspective view of the liquid handling system of FIGS. 5a-5c.
Figure 7A:
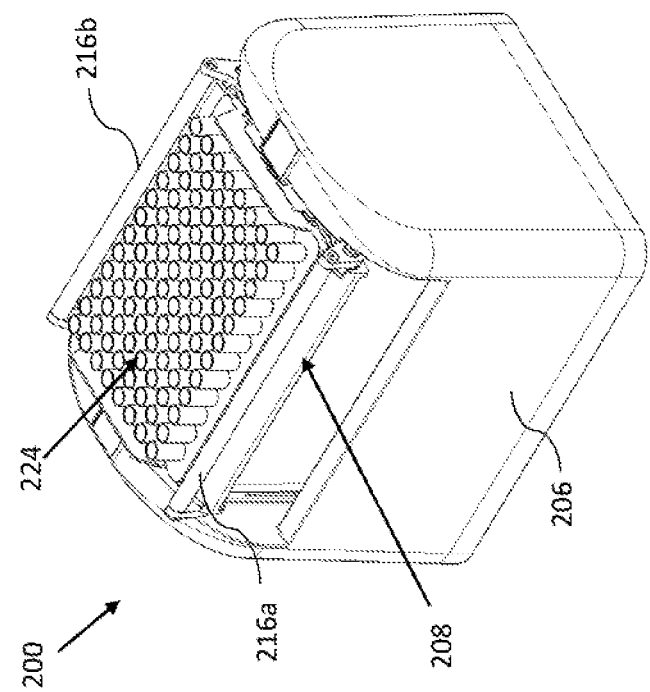
FIG. 7a is a perspective view of a tip box for the liquid handling system of FIGS. 5a-5c.

Referring now to FIGS. 7a-7b, a system 200 is shown without and with a liquid handling device 202, respectively, in accordance with the subject technology. The lever arm ends 216 in the example shown are cylindrically shaped to engage with the arcuate shaped hooks of the adaptor portion 202b of the handling device 202. As the liquid handling device 202 is moved towards the tip box 206, the adaptor portion 202b hooks move around the outside of the arm ends 216, before closing around and engaging the arm ends 216, as discussed above.

Referring now to FIGS. 7c-7f, operation of the lever mechanism 208 is shown. FIG. 7c shows an initial position, prior to the lever mechanism 208 engaging the liquid handling device 202. As the liquid handling device 202 is moved towards the tip box 206, the hooks of the adaptor portion 202b move around the cylindrical lever arm ends 216, as shown in FIG. 7d. The downward force "F" from the handling device 202 causes the central portion of the tip box 206 to move downward (i.e. from the position of FIG. 7e to the position of FIG. 7f). This in turn causes action by the lever mechanism 208, with the lever arm ends 216 pulling downward on the hooks of the adaptor portion 202b to urge the liquid handling device 202 and tip box 206 together.

Figure 8:
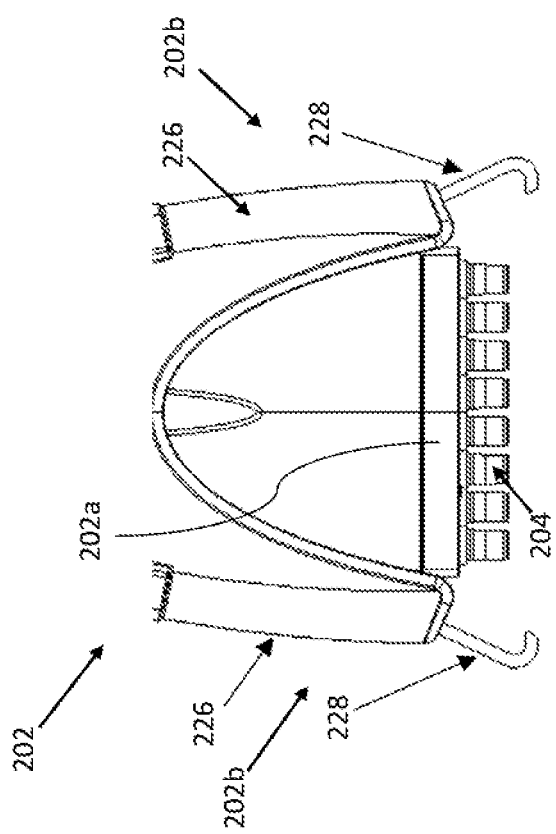
FIG. 8 is a front view of a liquid handling device for the liquid handling system of FIGS. 5a-5c.

Referring now to FIG. 8, a liquid handling device 202 in accordance with the subject technology is shown, with the details of the adaptor portion 202b shown distinctly. In particular, the adaptor portion 202b includes exterior support members 226 and hooks 228. The exterior support members 226 attach around the outside of the device body 202a to hold the hooks 228 in place. After the hooks 228 are moved around the lever arm ends 216, the exterior support members 226 can be manipulated to cause the hooks to move toward the central axis "a" to surround and connect to the lever arm ends 216.

Figure 9:
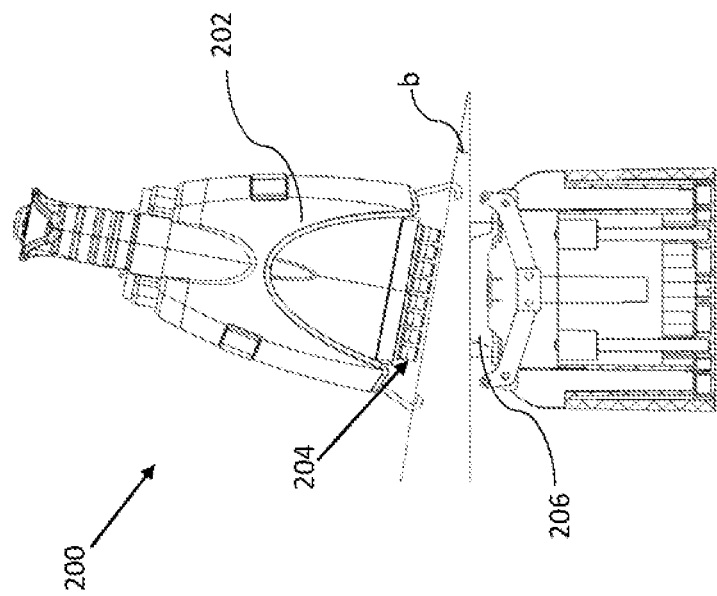
FIG. 9 is a front view of the liquid handling system of FIGS. 5a-5c showing the liquid handling device and tip box out of alignment.

Referring now to FIG. 9, another embodiment of the system 200 is shown, wherein the liquid handling device 202 and the tip box are out of alignment. This can result in misalignment between the pipette heads 204 and the tips 224 (not distinctly shown in FIG. 9) during insertion. To avoid this problem, the system 200 can include an elastic component implemented in the liquid handling device 202, the tip box 206, or in both. The deformation or displacement of the elastic component compensates for a possible tilt angle "b" between the liquid handling device 202 and tip box 206. This ensures that the force from the liquid handling device 202 is applied more evenly across the tips 224, such that all the tips 224 undergo a similar applied force. Additionally, or alternatively, an additional degree of freedom in the vertical mechanical movement of the tip box 206 may be implemented to ensure perpendicularity between the liquid handling device 202 and tip box 206.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

What is claimed is:

1. A liquid handling system, comprising:
   a liquid handling device having a plurality of pipetting heads;
   a tip box having a plurality of tips configured for removable attachment to the pipetting heads; and
   a lever mechanism configured to engage the liquid handling device and the tip box during a process of moving the liquid handling device along a central axis in the direction of the tip box for attachment of the tips to the pipetting heads, the lever mechanism including:
a first lever arm attached to a first fulcrum proximate the central axis, extending outwardly from the central axis, and terminating in a first arm end; and
a second lever arm attached to a second fulcrum proximate the central axis, extending outwardly from the central axis, and terminating in a second arm end,
wherein the lever mechanism is configured to receive a force from the liquid handling device proximate the first fulcrum and the second fulcrum, the first lever arm and second lever arm applying an opposite force to urge the tip box and liquid handling device together.

2. The system of claim 1, wherein the first lever arm and second lever arm are configured to apply the opposite force by engaging, by the first arm end and the second arm end, opposing sides of a periphery of the tip box to urge the tip box towards the liquid handling device.

3. The system of claim 2, wherein the first lever arm and the second lever arm include flanges, the first lever arm and second lever arm being configured to apply the opposite force by engaging, with the flanges of the first lever arm and second lever arm, flanges of the periphery of the tip box.

4. The system of claim 2 wherein:
the periphery of the tip box has a first periphery member on a first side of the tip box and a second periphery member on an opposing side of the tip box; and
the lever mechanism is configured such that when the lever mechanism applies the opposite force, the first arm end engages the first periphery member and the second arm end engages the second periphery member.

5. The system of claim 1, wherein the first lever arm and second lever arm are configured to apply the opposite force by engaging, by the first arm end and the second arm end, opposing sides of a periphery of the liquid handling device to urge the liquid handling device toward the tip box.

6. The system of claim 5 wherein:
the periphery of the liquid handling device includes a first periphery member on a first side of the liquid handling device and a second periphery member on an opposing side of the liquid handling device; and
the lever mechanism is configured such that when the lever applies the opposite force, the first arm end engages the first periphery member and the second arm end engages the second periphery member.

7. The system of claim 6 wherein:
the first periphery member and the second periphery member each include hooks;
the first arm end and the second arm end are cylindrical;
the first arm end is configured to engage the first periphery member by moving the cylindrical first arm end within a hook of the first periphery member; and
the second arm end is configured to engage the second periphery member by moving the cylindrical second arm end within a hook of the second periphery member.

8. The system of claim 1, wherein the liquid handling device further includes an elastic component configured to flex during insertion of the pipetting heads into the tips to evenly apply force across the tips.

9. The system of claim 1, wherein the tip box further includes an elastic component configured to flex during insertion of the pipetting heads into the tips to evenly apply force across the tips.

10. A method for connecting components during liquid handling, comprising:
providing a liquid handling device having a plurality of pipetting heads;
providing a tip box having a plurality of tips configured for removable attachment to the pipetting heads;
aligning the liquid handling device and the tip box along a central axis;
positioning a lever mechanism along the central axis to engage the liquid handling device and the tip box during a processing of moving the liquid handling device along the central axis in the direction of the tip box for attachment of the tips to the pipetting heads, the lever mechanism including: a first lever arm attached to a first fulcrum positioned proximate the central axis, extending outwardly from the central axis, and terminating in a first arm end; and a second lever arm attached to a second fulcrum positioned proximate the central axis, extending outwardly from the central axis, and terminating in a second arm end; and
attaching the tips to the pipetting heads by moving the liquid handling device along the central axis to apply a force proximate the first fulcrum and the second fulcrum such that the first lever arm and second lever arm apply an opposite force to urge the tip box and liquid handling device together.

11. The method of claim 10, wherein, during the step of attaching the tips to the pipetting heads, the opposite force is applied by engaging, by the first arm end and the second arm end, opposing sides of a periphery of the tip box to urge the tip box towards the liquid handling device.

12. The method of claim 11, wherein, during the step of attaching the tips to the pipetting heads, the opposite force is applied by engaging, with flanges of the first lever arm and second lever arm, flanges of the periphery of the tip box.

13. The method of claim 11, wherein, during the step of attaching the tips to the pipetting heads, the lever mechanism applies the opposite force by engaging a first periphery member on a first side of the tip box with the first arm end and engaging a second periphery member on an opposing side of the tip box with the second arm end.

14. The method of claim 10, during the step of attaching the tips to the pipetting heads, the opposite force is applied by engaging, by the first arm end and the second arm end, opposing sides of a periphery of the liquid handling device to urge the liquid handling device toward the tip box.

15. The method of claim 14, wherein, during the step of attaching the tips to the pipetting heads, the lever mechanism applies the opposite force by engaging a first periphery member on a first side of the liquid handling device with the first arm end and a second periphery member on an opposing side of the liquid handling device with the second arm end.

16. The method of claim 15, wherein:
the first periphery member and the second periphery member each include hooks;
the first arm end and the second arm end are cylindrical; and
during the step of attaching the tips to the pipetting heads, the cylindrical first arm end is moved within a hook of the first periphery member and the cylindrical second arm end is moved within a hook of the second periphery member.

17. The method of claim 10, wherein, during the step of attaching the tips to the pipetting heads, an elastic component of the liquid handling device is flexed to evenly apply force across the tips.

18. The method of claim 10, wherein, during the step of attaching the tips to the pipetting heads, an elastic component of the tip box is flexed to evenly apply force across the tips.

\* \* \* \* \*

UNITED STATES PATENT AND TRADEMARK OFFICE
CERTIFICATE OF CORRECTION

| | | |
|---|---|---|
| PATENT NO. | : 11,402,399 B2 | |
| APPLICATION NO. | : 16/535269 | |
| DATED | : August 2, 2022 | |
| INVENTOR(S) | : Sylvain Charmillot et al. | |

It is certified that error appears in the above-identified patent and that said Letters Patent is hereby corrected as shown below:

On the Title Page

Abstract:
In the last line, delete the word "lesser" from the phrase "to lesser the required insertion force", and replace it with "lessen".

In the Specification

Column 1, Line 40:
Insert a letter --s-- at the end of the word "consumable".

Column 1, Line 60:
Insert a letter --a-- between the words "as" and "removable".

Column 2, Line 11:
Delete the letter "s" at the end of the word "costs".

Column 2, Line 15:
Delete the word "maybe" and replace it with the words "may" and "be".

Column 2, Line 56:
In the phrase "insertion for necessary", delete the word "for" and replace it with "force".

Column 3, Line 13:
In the phrase "second lever are configured", insert the word --arm-- after "lever".

Column 3, Line 17:
In the phrase "the second lever can include flanges," insert the word --arm-- after "lever".

Signed and Sealed this
Fourth Day of October, 2022

Katherine Kelly Vidal
*Director of the United States Patent and Trademark Office*

CERTIFICATE OF CORRECTION (continued)
U.S. Pat. No. 11,402,399 B2

Column 3, Line 29:
In the phrase "second lever are configured to", insert the word --arm-- after "lever".

Column 3, Line 65:
Delete the word "processing" and replace it with "process".

Column 5, Line 42:
In the phrase "larger than the eight of the liquid handler)", delete the word "eight" and replace it with "weight".

Column 5, Line 54:
In the phrase "Referring now to FIG. 1-4,", delete the word "FIG." and replace it with "FIGS.".

Column 5, Line 56:
In the phrase "liquid handling system includes 100", insert the number --100-- in between "system" and "includes", and delete the number "100" after "includes".

Column 5, Lines 58-59:
In the phrase "(not distinctly show)", delete the word "show" and replace it with "shown".

Column 7, Line 38:
In the phrase "with respect the aperture", insert the word --to-- in between the words "respect" and "the".

In the Claims

Column 10, Line 9 (Claim 10):
In the phrase "during a processing of", delete the word "processing" and replace it with "process".